US008905618B2

(12) United States Patent
Kuo et al.

(10) Patent No.: US 8,905,618 B2
(45) Date of Patent: Dec. 9, 2014

(54) COMBINED BACKPLANE AND BACKLIGHT MODULE USING SAME

(75) Inventors: Yicheng Kuo, Shenzhen (CN); Gege Zhou, Shenzhen (CN)

(73) Assignee: Shenzhen China Star Optoelectronics Technology Co., Ltd., Shenzhen, Guangdong Province (CN)

( * ) Notice: Subject to any disclaimer, the term of this patent is extended or adjusted under 35 U.S.C. 154(b) by 115 days.

(21) Appl. No.: 13/515,258

(22) PCT Filed: Mar. 26, 2012

(86) PCT No.: PCT/CN2012/073073
§ 371 (c)(1),
(2), (4) Date: Jun. 11, 2012

(87) PCT Pub. No.: WO2013/134970
PCT Pub. Date: Sep. 19, 2013

(65) Prior Publication Data
US 2013/0242540 A1    Sep. 19, 2013

(30) Foreign Application Priority Data

Mar. 13, 2012 (CN) .......................... 2012 1 0065380

(51) Int. Cl.
*F21V 7/04* (2006.01)
(52) U.S. Cl.
USPC .......................................... 362/633; 362/632

(58) Field of Classification Search
USPC .......................................... 362/623–633, 612
See application file for complete search history.

(56) References Cited

U.S. PATENT DOCUMENTS

| 8,358,387 B2 * | 1/2013 | Choi et al. ...................... 349/65 |
| 2010/0271845 A1 * | 10/2010 | Chiu et al. ...................... 362/633 |
| 2011/0090426 A1 * | 4/2011 | Choi et al. ...................... 349/65 |
| 2011/0141670 A1 * | 6/2011 | Jeong ...................... 361/679.01 |
| 2011/0292317 A1 * | 12/2011 | Kim et al. ...................... 349/61 |

FOREIGN PATENT DOCUMENTS

| CN | 101226302 A | 7/2008 |
| CN | 202082747 U | 12/2011 |

* cited by examiner

*Primary Examiner* — Julie Bannan
(74) *Attorney, Agent, or Firm* — Cheng-Ju Chiang

(57) ABSTRACT

The present invention provides a combined backplane and a backlight module using the combined backplane. The combined backplane includes a body and a first bracket coupled to the body. The body includes a base plate. The first bracket includes a first bottom plate and a first side plate perpendicularly connected to the first bottom plate. The first bottom plate has an end distant from the first side plate and coupled to an end of the base plate. The base plate and the first bracket are made of different materials. The combined backplane of the present invention is formed by combining a body with a bracket. The body is made of a high-strength material to improve overall strength of the backplane and the bracket is made of a material of high thermal conductivity to improve overall thermal conductivity of the whole backplane.

10 Claims, 2 Drawing Sheets

COMBINED BACKPLANE AND BACKLIGHT MODULE USING SAME

BACKGROUND OF THE INVENTION

1. Field of the Invention

The present invention relates to the field of liquid crystal displaying, and in particular to a combined backplane and a backlight module using the combined backplane.

2. The Related Arts

Liquid crystal display (LCD) has a variety of advantages, such as compact device size, low power consumption, and being free of radiation, and is thus widely used. Most of the LCDs that are currently available in the market are backlighting LCDs, which comprise a liquid crystal display panel and a backlight module. The working principle of the liquid crystal display panel is that liquid crystal molecules interposed between two parallel glass plates and a plurality of vertical and horizontal fine electrical wires is arranged between the two glass plates, whereby the liquid crystal molecules are controlled to change direction by application of electricity to refract light emitting from the backlight module for generating images. Since the liquid crystal display panel itself does not emit light, light must be provided by the backlight module in order to generate images. Thus, the backlight module is one of the key components of an LCD. The backlight module can be classified as two types, namely side-edge backlight module and direct backlight module, according to the position where light gets incident. The direct backlight module arranges a light source, such as a cold cathode fluorescent lamp (CCFL) or a light-emitting diode (LED) at the back side of the liquid crystal display panel to form a planar light source to directly provide lighting to the liquid crystal display panel. The side-edge backlight module arranged a backlight source, such as an LED light bar based light source, at an edge of a back panel that is located rearward of one side of the liquid crystal display panel. The LED backlight source emits light that enters a light guide plate through a light incident face of the light guide plate and is projected out through a light exit face after being reflected and diffused to thereby form a planar light source to be provided to the liquid crystal display panel.

A conventional backlight module generally comprises a backplane, a light guide board, a backlight source, and optic films. The backplane is generally made of a single material, which is for example aluminum plate, steel plate, or plastic plate. If the backplane is completely made of a steel plate, then a heat dissipation element is additionally used. This increases the costs. If the backplane is completely made of an aluminum plate, then no additional heat dissipation element is necessary. Although aluminum has better thermal conductivity than steel, yet the backplane uses only a portion thereof to effect heat dissipation, while the remaining portion provides a function of support rather than dissipation of heat. This is adverse to expenditure control and support and retention of liquid crystal module.

The conventional ways of mounting a backlight source to a backplane includes thermally conductive adhesive tapes or bolts. A backlight source can be fixed by thermally conductive adhesive tapes to a backplane, but the thermally conductive adhesive tapes have great thermal resistance and has a thermal conductivity of around 0.9-6 W/K*m. On the other hand, aluminum shows a thermal conductivity up to 137 W/K*m. Although the thermal conductivities of the backlight source and the backplane are great, yet the thermally conductive adhesive tapes have relatively low thermal conductivity, so that the heat generated by the backlight source cannot be efficiently removed. For the case where the backlight source is fixed to the backplane by bolts, air layers are commonly present between the backlight source and the backplane at locations where no bolt is applied. Since the thermal conductivity of air is even poorer, the thermal resistance at the contact surface is increased, making the overall heat dissipation poor.

SUMMARY OF THE INVENTION

An objective of the present invention is to provide a combined backplane, which is formed by jointing a body and a bracket so as to show a simple structure, high strength, good thermal conductivity, and low cost.

Another objective of the present invention is to provide a backlight module, which uses the above discussed combined backplane so as to reduce the manufacture cost and at the same time maintain the quality of backlight module.

To achieve the objectives, the present invention provides a combined backplane, which comprises a body and a first bracket coupled to the body. The body comprises a base plate. The first bracket comprises a first bottom plate and a first side plate perpendicularly connected to the first bottom plate. The first bottom plate has an end distant from the first side plate and coupled to an end of the base plate. The base plate and the first bracket are made of different materials.

The base plate is made of a high-strength material and the first bracket is made of a material of high thermal conductivity.

The base plate is made of steel sheet and the first bracket is made of aluminum sheet.

The end of the first bottom plate that is distant from the first side plate forms a first bend section and a first extension section connected to the first bend section. The first extension section overlaps an end of the base plate and is fixed to the base plate by rivets or bolts.

The body further comprises a stop plate that is perpendicularly mounted to an opposite end of the base plate. The stop plate and the base plate are made of the same material.

The body further comprises a second bracket coupled to an opposite end of the base plate. The second bracket is made of a material of high thermal conductivity and comprises a second bottom plate and a second side plate perpendicularly mounted to the second bottom plate. The second bottom plate has an end distant from the second side plate and forms a second bend section and a second extension section connected to the second bend section. The second extension section overlaps said opposite end of the base plate and is fixed to the base plate by rivets or bolts.

The second bracket is made of aluminum sheet.

The present invention also provides a backlight module, which comprises a combined backplane, a backlight source mounted to the combined backplane, a reflector board positioned in the combined backplane, a light guide board arranged on the reflector board, and an optic film positioned on the light guide board. The combined backplane comprises a body and a first bracket coupled to the body. The body comprises a base plate. The first bracket comprises a first bottom plate and a first side plate perpendicularly connected to the first bottom plate. The first bottom plate has an end distant from the first side plate and coupled to an end of the base plate. The base plate is made of a high-strength material. The first bracket is made of a material of high thermal conductivity. The backlight source comprises a linear light-emitting diode light bar, and the backlight source is fixed to the first bracket through fusion.

The body further comprises a second bracket coupled to the base plate. The second bracket is made of a material of high thermal conductivity. The backlight source is fixed to the second bracket through fusion.

The base plate is made of steel sheet and the first and second brackets are made of aluminum sheet. The fusion comprises welding.

The efficacy of the present invention is that the present invention provides a combined backplane that is formed by combining a body with a bracket. The body is made of a high-strength material to improve overall strength of the backplane and the bracket is made of a material of high thermal conductivity to improve overall thermal conductivity of the whole backplane so as to reduce the manufacture cost and at the same time improve the thermal conductivity. The present invention also provides a backlight module that uses the combined backplane so as to improve the overall strength of the whole backlight module and at the same time to maintain thermal conduction. Further, a backlight source is fixed to the bracket that is made of the material of high thermal conductivity through fusion so as to form gap-free connection between the backlight source and the bracket to further improve the thermal conductivity of the backlight module and enhance the quality of the backlight module.

For better understanding of the features and technical contents of the present invention, reference will be made to the following detailed description of the present invention and the attached drawings. However, the drawings are provided for the purposes of reference and illustration and are not intended to impose undue limitations to the present invention.

BRIEF DESCRIPTION OF THE DRAWINGS

The technical solution, as well as beneficial advantages, will be apparent from the following detailed description of embodiments of the present invention, with reference to the attached drawings. In the drawings.

DETAILED DESCRIPTION OF THE PREFERRED EMBODIMENTS

To further expound the technical solution adopted in the present invention and the advantages thereof, a detailed description is given to preferred embodiments of the present invention and the attached drawings.

Figure 1:
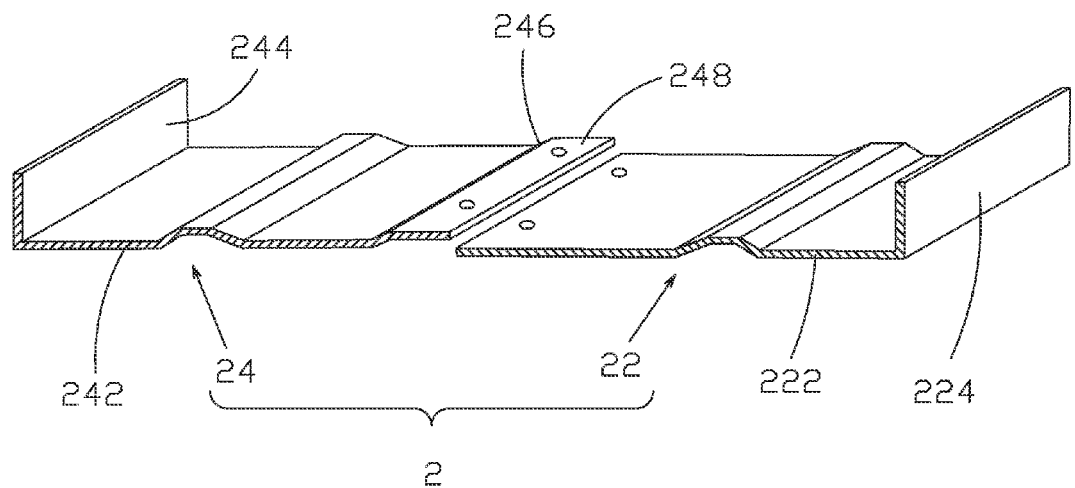
FIG. 1 is an exploded view of a combined backplane according to an embodiment of the present invention.
Figure 2:
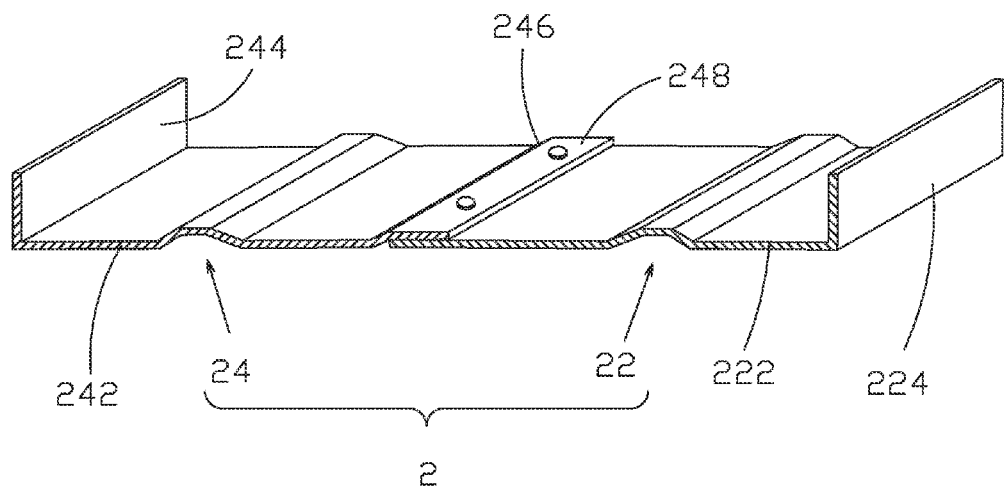
FIG. 2 is an assembled view of FIG. 1.

Referring to FIGS. 1 and 2, the present invention provides a combined backplane 2, which comprises a body 22 and a first bracket 24 coupled to the body 22.

The body 22 comprises a base plate 222 and a stop plate 224 perpendicularly mounted to the base plate 222. The base plate 222 and the stop plate 224 are made of the same material. The body 22 is made of a high-strength material and in the instant embodiment, the body 22 is made of steel sheet in order to reduce the manufacture cost and at the same time maintain the overall strength of the combined backplane 2.

The first bracket 24 comprises a first bottom plate 242 and a first side plate 244 perpendicularly mounted to the first bottom plate 242. The first bottom plate 242 has an end that is distant from the first side plate 244 and forms a first bend section 246 and a first extension section 248 connected to the first bend section 246. The first extension section 248 is set horizontal and the first extension section 248 overlaps an end of the base plate 222 and is fixed to the base plate 222 by rivets or screws. The first bracket 24 is made of a material of high thermal conductivity and in the instant embodiment, the first bracket 24 is made of aluminum sheet in order to ensure the thermal conduction of the whole combined backplane 2.

The combined backplane according to the instant embodiment of the present invention is applicable to single-side incidence backlight modules in which light is incident at a single side. The present invention is also applicable to dual-side incidence backlight modules that receive light at two sides.

Figure 3:
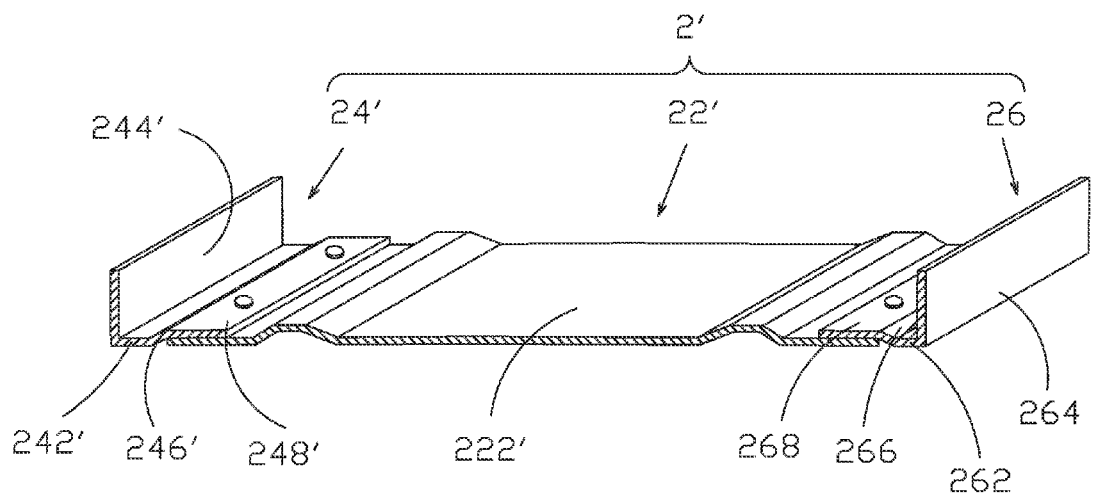
FIG. 3 is an assembled view of a combined backplane according to another embodiment of the present invention.

As shown in FIG. 3, a combined backplane 2' according to another embodiment of the present invention is provided for dual-side incidence side-edge backlight module. In the instant embodiment, the combined backplane 2' comprises a body 22' and a first bracket 24' coupled to the body 22'. The body 22' comprises a base plate 222' and a second bracket 26 coupled to the base plate 222'. The first bracket 24' comprises a first bottom plate 242' and a first side plate 244' perpendicularly mounted to the first bottom plate 242'. The first bottom plate 242' has an end distant from the first side plate 244' and forming a first bend section 246' and a first extension section 248' connected to the first bend section 246'. The first extension section 248' is set horizontal and the first extension section 248' overlaps an end of the base plate 222' and is fixed to the base plate 222' by rivets or screws. The second bracket 26 comprises a second bottom plate 262 and a second side plate 264 perpendicularly mounted to the second bottom plate 262. The second bottom plate 262 has an end distant from the second side plate 264 and forming a second bend section 266 and a second extension section 268 connected to the second bend section 266. The second extension section 268 is set horizontal and the second extension section 268 overlaps an opposite end of the base plate 222' and is fixed to the base plate 222' by rivets or screws.

The base plate 222' is made of a high-strength material and in the instant embodiment, the base plate 222' is made of steel sheet in order to reduce the manufacture cost and at the same time maintain the overall strength of the combined backplane 2'.

The first and second brackets 24', 26 are made of a material of high thermal conductivity and in the instant embodiment, the first and second brackets 24', 26 are made of aluminum sheet in order to ensure the thermal conduction of the whole combined backplane 2'.

Figure 4:
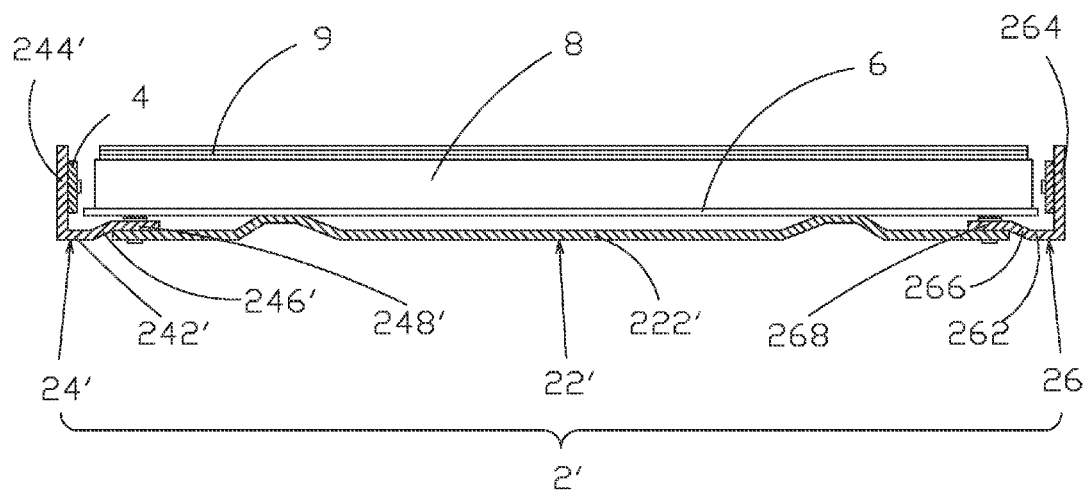
FIG. 4 is a cross-sectional view showing the structure of backlight module according to an embodiment of the present invention.

The present invention also provides a backlight module using the above described combined backplane 2'. As shown in FIG. 4, a backlight module according to an embodiment of the present invention comprises the combined backplane 2', backlight sources 4 mounted to the combined backplane 2', a reflector board 6 positioned in the combined backplane 2', a light guide board 8 arranged on the reflector board 6, and optic films 9 positioned on the light guide board 8.

The combined backplane 2' comprises a body 22' and a first bracket 24' coupled to the body 22'. The body 22' comprises a base plate 222' and a second bracket 26 coupled to the base plate 222'. The first bracket 24' comprises a first bottom plate 242' and a first side plate 244' perpendicularly mounted to the first bottom plate 242'. The first bottom plate 242' has an end distant from the first side plate 244' and forming a first bend section 246' and a first extension section 248' connected to the first bend section 246'. The first extension section 248' is set horizontal and the first extension section 248' overlaps an end of the base plate 222' and is fixed to the base plate 222' by rivets or screws. The second bracket 26 comprises a second bottom plate 262 and a second side plate 264 perpendicularly mounted to the second bottom plate 262. The second bottom plate 262 has an end distant from the second side plate 264 and forming a second bend section 266 and a second extension section 268 connected to the second bend section 266. The second extension section 268 is set horizontal and the second extension section 268 overlaps an opposite end of the base plate 222' and is fixed to the base plate 222' by rivets or screws. The base plate 222' is made of a high-strength material and the first and second brackets 24', 26 are made of a material of high thermal conductivity.

In the instant embodiment, the base plate 222' is made of steel sheet in order to reduce the manufacture cost and at the same time maintain the overall strength of the combined backplane 2'. The first and second brackets 24', 26 are made of aluminum sheet in order to ensure the thermal conduction of the whole combined backplane 2'.

The backlight sources 4 comprise linear LED (Light-Emitting Diode) light bars. The backlight sources 4 are fixed to the first bracket 24' and the second bracket 26 through fusion operation. In the instant embodiment, the fusion operation comprises welding to provide gap-free connection between the backlight source 4 and the backplane 2', thereby further improving thermal conductivity of the backlight module.

In summary, the present invention provides a combined backplane that is formed by combining a body with a bracket. The body is made of a high-strength material to improve overall strength of the backplane and the bracket is made of a material of high thermal conductivity to improve overall thermal conductivity of the whole backplane so as to reduce the manufacture cost and at the same time improve the thermal conductivity. The present invention also provides a backlight module that uses the combined backplane so as to improve the overall strength of the whole backlight module and at the same time to maintain thermal conduction. Further, a backlight source is fixed to the bracket that is made of the material of high thermal conductivity through fusion so as to form gap-free connection between the backlight source and the bracket to further improve the thermal conductivity of the backlight module and enhance the quality of the backlight module.

Based on the description given above, those having ordinary skills of the art may easily contemplate various changes and modifications of the technical solution and technical ideas of the present invention and all these changes and modifications are considered within the protection scope of right for the present invention.

What is claimed is:

1. A combined backplane, comprising a body and a first bracket coupled to the body, the body comprising a base plate, the first bracket comprising a first bottom plate and a first side plate perpendicularly connected to the first bottom plate, the first bottom plate having an end distant from the first side plate and coupled to an end of the base plate, the base plate and the first bracket being made of different materials, the base plate being made of a high-strength material, the first bracket being made of a material of high thermal conductivity;

wherein the end of the first bottom plate that is distant from the first side plate forms a first bend section and a first extension section connected to the first bend section, the first bottom plate, the first bend section, and the first extension section being of the same thickness to achieve substantially the same strength through the first bottom plate, the first bend section, and the first extension section, the first extension section overlapping an end of the base plate and fixed to the base plate.

2. The combined backplane as claimed in claim 1, wherein the base plate is made of steel sheet and the first bracket is made of aluminum sheet.

3. The combined backplane as claimed in claim 1, wherein the first extension section is fixed to the base plate by rivets or bolts.

4. The combined backplane as claimed in claim 1, wherein the body further comprises a stop plate that is perpendicularly mounted to an opposite end of the base plate, the stop plate and the base plate being made of the same material.

5. The combined backplane as claimed in claim 1, wherein the body further comprises a second bracket coupled to an opposite end of the base plate, the second bracket being made of a material of high thermal conductivity and comprising a second bottom plate and a second side plate perpendicularly mounted to the second bottom plate, the second bottom plate having an end distant from the second side plate and forming a second bend section and a second extension section connected to the second bend section, the second bottom plate, the second bend section, and the second extension section being of the same thickness to achieve substantially the same strength through the second bottom plate, the second bend section, and the second extension section, the second extension section overlapping said opposite end of the base plate and fixed to the base plate by rivets or bolts.

6. The combined backplane as claimed in claim 5, wherein the second bracket is made of aluminum sheet.

7. A backlight module, comprising a combined backplane, a backlight source mounted to the combined backplane, a reflector board positioned in the combined backplane, a light guide board arranged on the reflector board, and an optic film positioned on the light guide board, the combined backplane comprising a body and a first bracket coupled to the body, the body comprising a base plate, the first bracket comprising a first bottom plate and a first side plate perpendicularly connected to the first bottom plate, the first bottom plate having an end distant from the first side plate and coupled to an end of the base plate, the base plate and the first bracket being made of different materials, the base plate being made of a high-strength material, the first bracket being made of a material of high thermal conductivity, the backlight source comprising a linear light-emitting diode light bar, the backlight source being fixed to the first bracket through fusion;

wherein the end of the first bottom plate that is distant from the first side plate forms a first bend section and a first extension section connected to the first bend section, the first bottom plate, the first bend section, and the first extension section being of the same thickness to achieve substantially the same strength through the first bottom plate, the first bend section, and the first extension section, the first extension section overlapping an end of the base plate and fixed to the base plate.

8. The backlight module as claimed in claim 7, wherein the base plate is made of steel sheet and the first bracket is made of aluminum sheet and the fusion comprises welding.

9. The backlight module as claimed in claim 7, wherein the body further comprises a second bracket coupled to the base plate, the second bracket being made of a material of high thermal conductivity, the backlight source being fixed to the second bracket through fusion.

10. The backlight module as claimed in claim 9, wherein the second bracket is made of aluminum sheet and the fusion comprises welding.

* * * * *